(12) United States Patent
Kimura

(10) Patent No.: US 12,505,004 B2
(45) Date of Patent: Dec. 23, 2025

(54) INFORMATION PROCESSING APPARATUS DETERMINING RISK GRADE BASED ON HEADER INFORMATION

(71) Applicant: FANUC CORPORATION, Yamanashi (JP)

(72) Inventor: Takeshi Kimura, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 18/696,115

(22) PCT Filed: Nov. 1, 2021

(86) PCT No.: PCT/JP2021/040288
§ 371 (c)(1),
(2) Date: Mar. 27, 2024

(87) PCT Pub. No.: WO2023/073997
PCT Pub. Date: May 4, 2023

(65) Prior Publication Data
US 2024/0394129 A1    Nov. 28, 2024

(51) Int. Cl.
*H04L 47/24* (2022.01)
*G06F 11/00* (2006.01)
(Continued)

(52) U.S. Cl.
CPC .......... *G06F 11/004* (2013.01); *G06F 11/321* (2013.01); *H04L 69/22* (2013.01);
(Continued)

(58) Field of Classification Search
CPC ...... G06F 11/004; G06F 11/321; H04L 69/22; H04L 43/08; H04L 43/0811;
(Continued)

(56) References Cited

U.S. PATENT DOCUMENTS

| | | | | |
|---|---|---|---|---|
| 2002/0141403 A1* | 10/2002 | Akahane | ............... | H04L 45/302 370/389 |
| 2008/0008165 A1* | 1/2008 | Ikeda | ...................... | H04L 45/60 370/360 |
| 2021/0303699 A1* | 9/2021 | Cheng | ................... | G06F 21/577 |

FOREIGN PATENT DOCUMENTS

| | | | | | |
|---|---|---|---|---|---|
| CA | 2998749 C | * | 3/2021 | .......... | G06F 11/3688 |
| CN | 111107147 A | * | 5/2020 | ............. | H04L 67/55 |

(Continued)

OTHER PUBLICATIONS

International Search Report issued in PCT/JP2021/040288; mailed Dec. 14, 2021.

*Primary Examiner* — Joseph O Schell
(74) *Attorney, Agent, or Firm* — Studebaker Brackett PLLC

(57) ABSTRACT

An information processing device according to one aspect of the present disclosure is capable of safely separating a communication path from a communication port, said information processing device comprising: a communication port that is for connecting a communication path with a communication device; a display unit that displays the state of the communication port; a communication control unit that controls communication with the communication device; a header extraction unit that extracts prescribed header information of communication data; a correspondence storage unit that stores a correspondence between the header information and a risk grade which is preset as a rating indicative of the probability that failure will occur as a result of separation of the communication path from the communication port; a risk determination unit that determines the current risk grade of the communication port on the basis of the correspondence and of the header information extracted by the header extraction unit; and a display control unit that (Continued)

displays a determination result by the risk determination unit on the display unit.

4 Claims, 2 Drawing Sheets

(51) Int. Cl.
*G06F 11/32* (2006.01)
*H04L 69/22* (2022.01)
*H04L 47/2466* (2022.01)
*H04L 47/32* (2022.01)

(52) U.S. Cl.
CPC ........ *H04L 47/245* (2013.01); *H04L 47/2466* (2013.01); *H04L 47/32* (2013.01)

(58) Field of Classification Search
CPC ... H04L 43/0817; H04L 49/35; H04L 49/351; H04L 49/355; H04L 47/245; H04L 47/2466; H04L 47/32
See application file for complete search history.

(56) References Cited

FOREIGN PATENT DOCUMENTS

| | | | |
|---|---|---|---|
| JP | 2002-215277 A | 7/2002 | |
| JP | 2010-010997 A | 1/2010 | |
| JP | 2012-048292 A | 3/2012 | |
| WO | WO-2018166131 A1 * | 9/2018 | ......... H04L 41/0803 |

* cited by examiner

FIG. 2

| COMMAND INFORMATION | RISK GRADE |
|---|---|
| – | 0 |
| User Login | 1 |
| User Logout | 1 |
| Data Reading | 2 |
| Data Writing | 2 |
| Software Updating | 3 | ized as one such communication port in Ethernet which

INFORMATION PROCESSING APPARATUS DETERMINING RISK GRADE BASED ON HEADER INFORMATION

TECHNICAL FIELD

The present invention relates to an information processing apparatus.

BACKGROUND ART various devices such as industrial machines and household electromechanical instruments have a communication function and are connected to a network. To effectively use a device connected to a network, it is necessary to set, in a control device that controls the network, communication conditions such as an IP address, a subnet mask, and a communication protocol for each communication device.

Many network systems include an information processing apparatus that has a plurality of communication ports for individually connecting, one-to-one, a plurality of communication devices to a network. A jack (female connector) of an RJ45 connector as defined mainly in ISO8877 is used, for example, as one such communication port in Ethernet which is a widespread network standard. Commonly, in an information processing apparatus that includes a plurality of communication ports, a number is assigned to each communication port, and a communication device is connected to a communication port of a number set in a communication condition in a control device. That is, in a conventional network system, it is necessary to insert a plug (male connector) provided at the tip of a cable extending from a communication device, into a communication port that is assigned a number that is the same as a number that is confirmed by the information processing apparatus. However, simply relying on the number of the communication port may lead to the communication device becoming connected to a communication port that is different from the set communication port.

In order to facilitate connection of a communication device to a correct communication port, a technology has been proposed in which a communication port to which a cable is to be connected is specified from among a plurality of communication ports based on information included in an event received from outside and connection information, and a lighting unit is lit so that the specified communication port and the other communication ports can be distinguished from each other (for example, refer to Patent Document 1).

CITATION LIST

Patent Document

Patent Document 1: Japanese Unexamined Patent Application, Publication No. 2010-10997

DISCLOSURE OF THE INVENTION

Problems to be Solved by the Invention

When newly connecting a communication device, it is sufficient to simply specify a communication port to which the communication device is to be connected. However, for example, in a case of replacing a communication device which is operating while being connected to a system that is operating, a failure may occur in the system depending on the timing at which the currently connected communication device is separated from the communication port. For example, when separating a communication path from a communication port during a process of updating software of a communication device, a failure may occur in the entire system. Therefore, a technology capable of safely separating a communication path from a communication port is desired.

Means for Solving the Problems

An information processing apparatus according to an embodiment of the present disclosure, including: a communication port that connects a communication path with a communication device; a display unit that displays a state of the communication port; a communication control unit that controls communication with the communication device; a header extraction unit that extracts predetermined header information from communication data; a correspondence storage unit that stores a correspondence between the header information and a risk grade that is preset as a grade representing a probability of a failure occurring due to separation of a communication path from the communication port; a risk determination unit that determines a current risk grade for the communication port based on the correspondence and the header information extracted by the header extraction unit; and a display control unit that causes the display unit to display a determination result of the risk determination unit.

Effects of the Invention

According to the present disclosure, the communication path can be safely isolated from the communication port.

BRIEF DESCRIPTION OF THE DRAWINGS

FIG. 2 is a table illustrating an example of correspondences between command information and risk grades.

PREFERRED MODE FOR CARRYING OUT THE INVENTION

Figure 1:
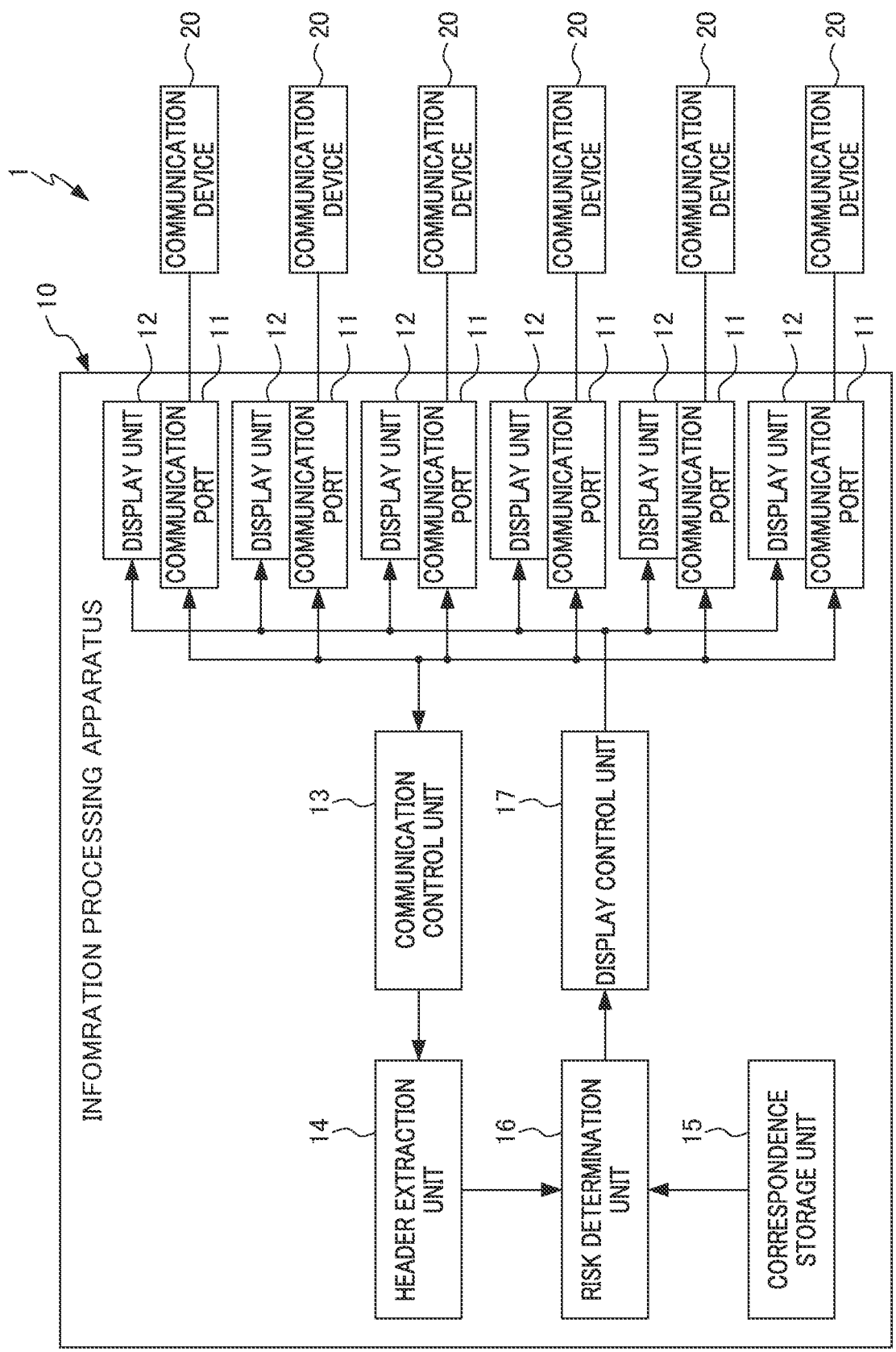
FIG. 1 is a block diagram illustrating a configuration of a network system that includes an information processing apparatus according to a first embodiment of the present disclosure.

Hereinafter, embodiments of the present disclosure are described with reference to the drawings. FIG. 1 is a block diagram illustrating a configuration of a network system 1 that includes an information processing apparatus 10 according to an embodiment of the present disclosure.

The network system 1 includes an information processing apparatus 10 according to an embodiment of the present disclosure and a plurality of communication devices 20 that communicate with the information processing apparatus 10 via communication paths. In the network system 1 of the present embodiment, it is assumed that the information processing apparatus 10 is a higher-level apparatus such as a control apparatus that manages the entire system or a server that provides instructions, data, and the like necessary for each communication device 20, and that the communication devices 20 are lower-level apparatuses such as a terminal, a client, or a slave. However, the information processing apparatus 10 according to the present disclosure may be lower-level apparatuses such as a terminal and a slave that are controlled by the communication devices 20 connected thereto, or may be apparatuses that are equivalent to the communication devices 20.

The information processing apparatus 10 can be implemented by causing a computer device having a processor, a memory, and the like to execute an appropriate control program. An auxiliary apparatus or a plurality of auxiliary apparatuses may be connected to the computer device that constitutes the information processing apparatus 10 as necessary. The information processing apparatus 10 is not limited to a general-purpose computer apparatus, and may be a peripheral apparatus such as a switching hub and a router.

The information processing apparatus 10 includes: a plurality of communication ports 11 that connect communication paths with the communication devices 20; a plurality of display units 12 that display respectively states of the plurality of communication ports 11; a communication control unit 13 that controls communication with the communication devices 20; a header extraction unit 14 that extracts predetermined header information from communication data; a correspondence storage unit 15 that stores correspondences between the header information and risk grades that are preset as grades representing probabilities of a failure occurring in the information processing apparatus 10 due to separation of communication paths from the plurality of communication ports 11; a risk determination unit 16 that determines current risk grades for the communication ports 11 based on the header information extracted by the header extraction unit 14 and the correspondence stored in the correspondence storage unit 15; and a display control unit 17 that displays the determination results of the risk determination unit 16 on the plurality of display units 12. In addition, the communication control unit 13, the header extraction unit 14, the correspondence storage unit 15, the risk determination unit 16 and the display control unit 17 are representative of different functions in the information processing apparatus 10 and may not necessarily have clearly separate physical configurations and program configuration.

The communication ports 11 may have connectors (generally female connector) conforming to standards such as RJ45, USB, and RS232C, and the like. The plurality of communication ports 11 may be disposed in a housing or a plurality of housings. Communication paths for communicating with the communication devices 20 are connected to the communication ports 11. Examples of the communication paths connected to the communication ports 11 include a communication cable physically connected to the communication device 20, a wireless adapter for establishing a wireless communication path with the communication device 20, and a connector directly provided to the communication device 20.

The display unit 12 is configured to display a risk grade for a communication port 11. The display units 12 may be provided to corresponding communication ports 11, respectively. Typically, the display unit 12 can be configured with light emitting elements such as LEDs so that a user can easily recognize a display. As a specific example, a connector such as an RJ 45 connector, which can be used as the communication port 11, has LEDs, and thus the LEDs can also be used as a display unit 12. RJ45 connectors have two LEDs, and typically a left LED is often controlled to light when transmitting and receiving data and a right LED is often controlled to light when a data link is established. Therefore, by flashing the right LED that indicates the establishment of the data link, the display unit 12 can be used as a display unit that indicates that the communication path of the communication port 11 is at risk of separating. Further, the display unit 12 may be controlled to display, in stages, the degree of risk of the communication path of the communication port 11 separating by a blinking pattern, blinking cycle, emission intensity, color, and the like of the light emitting element.

The display unit 12 may be configured to mechanically change a visual state. By way of example, the display unit 12 can be configured to indicate that the communication path is at risk of separating from the communication port 11, by protruding from a housing of the marker, moving from the opening to a visible position, or the like.

As the display unit 12, a display device capable of displaying information such as characters and images may be provided independently of the communication port 11. As a specific example, the degree of risk of a failure occurring due to separation of a communication path from the communication port 11 can be displayed easily by using, for example, a 7-segment LED, a 16-segment LED, a small liquid crystal display panel, or the like as the display unit 12. When such a display device is used, in order to display risk grades of a plurality of communication ports 11, a single display unit 12 may be provided which simultaneously displays information specifying the communication ports 11 and information specifying the risk grades.

The communication control unit 13 controls communication with the communication devices 20 via the corresponding communication ports 11, and can perform, for example, control over the data link layer in the OSI reference model under communication conditions conforming to various standards. As a specific example, in the data link layer, the communication control unit 13 can perform data transfer conforming to a standard for the connector of the communication port 11, for example, an Ethernet standard, a USB standard, or the like. The communication control unit 13 may perform control according to higher control procedures such as error correction, retransmission control, and file transfer as communication conditions.

Therefore, the communication control unit 13 may include a setting storage unit that stores communication conditions set for each communication port 11, and a main control unit that controls communication with the communication devices 20 via the communication ports 11 in accordance with the communication conditions stored in the setting storage unit. Examples of the communication conditions stored in the setting storage unit include each IP address of the communication devices 20 connected via the communication ports 11, information such as a subnet mask, and communication protocols applied to communication with the communication devices 20.

The header extraction unit 14 extracts, from communication data transmitted and received via the communication port 11, predetermined header information to be used for determining a risk grade for communication path separation from the communication ports 11. The communication data has a format that includes a header and data, and the header may include version information, sequence number, command type, and the like. Thus, the header extractor 14 may be configured to extract command information included in the header of the communication data. Specific examples of the command information to be extracted can include "User Login", "User Logout", "Data Reading", "Data Writing" and "Software Updating".

The correspondence storage unit 15 may store a reference table indicating the correspondences between the command information and the risk grades. FIG. 2 illustrates an example of a reference table of the correspondences stored in the correspondence storage unit 15. In this example, the risk grades are separated into multiple stages as four ranks from "0" that represents safety to the "3" that represents the most danger, but the risk grades may have only two ranks as a relatively safe rank and an at-risk rank.

The correspondence storage unit 15 may store other information necessary for the risk determination unit 16 to determine the risk grade. The correspondence storage unit 15 may be configured to refer to a storage device such as a hard disk drive or may be configured to read information into a working memory in advance. Further, the correspondence storage unit 15 may be configured such that information such as correspondences to be stored can be updated by communication via the communication ports 11.

The risk determination unit 16 determines, based on the header information extracted by the header extraction unit 14 and the correspondences stored in the correspondence relationship storage unit 15, the current risk grades for the communication ports 11 that transmit and receive communication data. Specifically, the risk determination unit 16 may be configured to determine, as rank values of the risk grades for the communication ports 11, rank values of risk grades that correspond to the header information of the communication data transmitted and received by the communication ports 11. In the case of using the reference table in FIG. 2, the risk determination unit 16 determines the risk grades of the communication ports 11 in multiple stages.

The risk determination unit 16 may be configured to consider the header information and other conditions of past communication data and then determine the risk grade for each communication port 11. By way of example, in a case in which the header information corresponds to holding information that is preset, the risk determination unit 16 may be configured to limit a range that the rank values of the risk grades can take until the header information corresponds to release information that is preset. In reference to the example of correspondences in FIG. 2, in a case in which the header information is "User Login", the correspondence storage unit 15 can be configured such that the rank value of the risk grade is not set to "0" but is held at "1" or more until communication data having header information that is "User Logout" is transmitted and received. In a case in which data communication establishes a link by "User Login" and releases the link by "User Logout", stability of the link safety while the link is established is improved by not lowering the rank value of the risk grade to "0".

Further, the risk determination unit 16 may be configured to consider an immediately-preceding risk grade or the header information and then determine, based on the immediately-preceding risk grade or the header information, a risk grade for new communication data. For example, in a case in which a rank value of the immediately-preceding risk grade is "2" or "3" and the header information of the new communication data does not correspond to the rank value "1" of the risk grade in the correspondence, the correspondence storage unit 15 can be configured to hold the risk grade of the new communication data at the rank value of the immediately-preceding risk grade. With such a configuration, it is possible to prevent a rank value such as a risk grade from being temporarily lowered when transmission and reception of other communication data interrupts transmission and reception of high-risk communication data. Therefore, the risk determination unit 16 can stop the communication path from disconnecting until after interruption processing ends and the transmission and the reception of the high-risk communication data is complete. One or both of the start and the release of holding such a risk grade may be determined based on the header information. That is, in a case in which specific header information (for example, a "Software Updating" command) is transmitted and received, holding the risk grade may start. Alternatively, in a case in which specific header information is transmitted and received, holding the risk grade may be released.

The display control unit 17 causes, for each communication port 11, a corresponding display unit 12 to display a risk determined by the risk determination unit 16.

The communication device 20 that can communicate with the information processing apparatus 10 is not particularly limited, and may be an unspecified device in a case in which a wireless adapter is connected to the communication port 11.

In the network system 1 described above, the risk grade of the communication path separation from each communication port 11 is determined and the determination result is displayed on the corresponding display unit 12. Thus, it is possible to recognize the timing at which the communication path can be safely separated from the communication port 11.

Although the embodiments of the present disclosure have been described above, the present disclosure is not limited to the embodiments described above. Further, the effects described in the above-described embodiments are merely examples of preferable effects caused by the present disclosure, and the effects according to the present invention are not limited to the effects described in the above-described embodiments.

By way of example, the information processing apparatus according to the present disclosure may have a single communication port.

EXPLANATION OF REFERENCE NUMERALS 1 network system
10 information processing apparatus
11 communication port
12 display unit
13 communication control unit
14 header extraction unit
15 correspondence storage unit
16 risk determination unit
17 display control unit
20 communication device

The invention claimed is:
1. An information processing apparatus, comprising:
a processor;
a memory;
a communication port that connects a communication path with a communication device; and
a display that displays a state of the communication port, wherein
the processor controls communication with the communication device;
the processor extracts predetermined header information from communication data;
the memory stores a correspondence between the header information and a risk grade that is preset as a grade representing a probability of a failure occurring due to separation of the communication path from the communication port;
the processor determines a current risk grade for the communication port based on the correspondence and the header information extracted by the processor;
the processor causes the display to display a determination result of the current risk grade, and the processor prevents the communication path from disconnecting until after interruption processing ends and transmission and reception of high-risk communication data is complete.

2. The information processing apparatus according to claim 1, wherein, in a case in which the header information corresponds to holding information that is preset, the processor limits a range that the risk grade can take until the header information corresponds to release information that is preset.

3. The information processing apparatus according to claim 1, wherein the processor considers an immediately-preceding risk grade or the header information and then determines, based on the immediately-preceding risk grade or the header information, a risk grade for new communication data.

4. The information processing apparatus according to claim 1, wherein the processor determines the risk grade by separating the risk grade into three or more ranks.

\* \* \* \* \*